United States Patent
Yang et al.

(10) Patent No.: US 12,035,379 B2
(45) Date of Patent: Jul. 9, 2024

(54) COMMUNICATION METHOD AND APPARATUS

(71) Applicant: HUAWEI TECHNOLOGIES CO., LTD., Guangdong (CN)

(72) Inventors: Shuigen Yang, Shanghai (CN); Henrik Olofsson, Kista (SE); Hongzhuo Zhang, Shanghai (CN); Chuan Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 17/481,941

(22) Filed: Sep. 22, 2021

(65) Prior Publication Data

US 2022/0015157 A1 Jan. 13, 2022

Related U.S. Application Data

(63) Continuation of application No. PCT/CN2020/078451, filed on Mar. 9, 2020.

(30) Foreign Application Priority Data

Mar. 22, 2019 (CN) .......................... 201910224315.7

(51) Int. Cl.
*H04W 74/0833* (2024.01)
*H04W 24/02* (2009.01)
*H04W 74/00* (2009.01)

(52) U.S. Cl.
CPC ....... *H04W 74/0858* (2013.01); *H04W 24/02* (2013.01); *H04W 74/008* (2013.01)

(58) Field of Classification Search
CPC ............. H04W 74/0858; H04W 24/02; H04W 74/008; H04W 72/27; H04W 74/0833; H04W 88/085; H04W 74/0841; H04W 74/085; H04W 56/001; H04W 74/0866; H04W 36/0077; H04W 74/004;
(Continued)

(56) References Cited

U.S. PATENT DOCUMENTS

| 2018/0279358 A1 | 9/2018 | Babaei et al. |
| 2018/0317263 A1 | 11/2018 | Ishii |
| 2019/0028905 A1 | 1/2019 | Veeramallu et al. |

(Continued)

FOREIGN PATENT DOCUMENTS

| CN | 101873712 A | 10/2010 |
| CN | 102149200 A | 8/2011 |

(Continued)

OTHER PUBLICATIONS

EP Communication Pursuant to Rule 71(3) EPC in European Appln No. 20777237.7, dated May 23, 2023, 49 pages.
(Continued)

*Primary Examiner* — Brian T O Connor
(74) *Attorney, Agent, or Firm* — Fish & Richardson P.C.

(57) ABSTRACT

The present disclosure discloses example communication methods and apparatuses. One example method includes obtaining physical random access channel (PRACH) configuration information of one or more cells by a first central unit (CU). The PRACH configuration information of the one or more cells is sent from the first CU to a first distributed unit (DU).

16 Claims, 7 Drawing Sheets

(58) Field of Classification Search
CPC .. H04W 74/006; H04W 72/21; H04L 5/0053; H04L 5/0094
See application file for complete search history.

(56) References Cited

U.S. PATENT DOCUMENTS

| | | | | |
|---|---|---|---|---|
| 2022/0110155 | A1* | 4/2022 | Chou | H04W 74/085 |
| 2022/0132578 | A1* | 4/2022 | da Silva | H04W 74/0833 |
| 2022/0141725 | A1* | 5/2022 | Parichehrehteroujeni | H04W 36/0058 370/331 |
| 2022/0295571 | A1* | 9/2022 | Da Silva | H04W 56/001 |
| 2023/0043737 | A1* | 2/2023 | Pantelidou | H04W 74/004 |

FOREIGN PATENT DOCUMENTS

| | | |
|---|---|---|
| CN | 105848183 A | 8/2016 |
| CN | 106416386 A | 2/2017 |
| CN | 106797641 A | 5/2017 |
| CN | 106817185 A | 6/2017 |
| CN | 107148086 A | 9/2017 |
| CN | 103797884 B | 1/2018 |
| CN | 107734600 A | 2/2018 |
| CN | 109152086 A | 1/2019 |
| CN | 109246850 A | 1/2019 |
| GB | 2591125 A | 7/2021 |
| WO | 2018231035 A1 | 12/2018 |

OTHER PUBLICATIONS

Office Action issued in Indian Application No. 202127042535 dated Mar. 21, 2022, 5 pages.
CATT, "On-demand SI Request Transmission," 3GPP TSG-RAN WG2 #97, R2-1701490, Athens, Greece, Feb. 13-17, 2017, 3 pages.
Nokia, Nokia Shanghai Bell, "PRACH preamble format details for capacity enhancement and beam management," 3GPP TSG-RAN WG1#90, R1-1713340, Prague, Czech Republic, Aug. 21-25, 2017, 7 pages.
Huawei, "Discussion of RACH optimization in NR," 3GPP TSG-RAN3 Meeting #103, R3-190379, Athens, Greece, 25 Feb. 25-Mar. 1, 2019, 3 pages.
Intel Corporation, "Coverage enhancement for PRACH for MTC," 3GPP TSG RAN WG1 Meeting #80bis, R1-151435, Belgrade, Serbia, Apr. 20-24, 2015, 5 pages.
Office Action issued in Chinese Application No. 201910224315.7 dated Nov. 11, 2021, 9 pages.
Qualcomm Incorporated, "Mechanisms for identifying strong gNB interferers," 3GPP TSG RAN WG1 Meeting #94, R1-1809456, Gothenburg, Sweden, Aug. 20-24, 2018, 3 pages.
Ericsson, "F1 setup request and response," 3GPP TSG RAN WG3 Meeting #97b, R3-173972, Prague, Czech Republic, Oct. 9-13, 2017, 4 pages.
3GPP TS 38.300 V15.4.0 (Dec. 2018), "3rd Generation Partnership Project; Technical Specification Group Radio Access Network; NR; NR and NG-RAN Overall Description; Stage 2(Release 15)," Dec. 2018, 97 pages.
3GPP TS 38.401 V15.4.0 (Dec. 2018), :3rd Generation Partnership Project; Technical Specification Group Radio Access Network; NG-RAN; Architecture description(Release 15),: Dec. 2018, 40 pages.
3GPP TS 38.473 V15.4.1 (Jan. 2019), "3rd Generation Partnership Project; Technical Specification Group Radio Access Network; NG-RAN; F1 application protocol (F1AP)(Release 15)," Jan. 2019, 192 pages.
Office Action issued in Chinese Application No. 201910224315.7 dated Apr. 21, 2021, 18 pages (with English translation).
PCT International Search Report and Written Opinion issued in International Application No. PCT/CN2020/078541 dated May 27, 2020, 15 pages (with English translation).
Ericsson, "Status Report RAN WG3," 3GPP TSG-RAN Meeting #86, RP-192361, Stiges, Spain, Dec. 9-12, 2019, 20 pages.
Extended European Search Report issued in European Application No. 20777237.7 dated Mar. 18, 2022, 20 pages.
Huawei, "(TP for SON BL CR for TS 38.473, TS 36.423): Leftovers on RACH Optimization Enhancements," 3GPP TSG-RAN WG3 Meeting #114-e, R3-220379, Dec. 2021, 20 pages.
Huawei et al., "(TP for SON BL CR for TS 38.423): PRACH configuration exchange, " 3GPP TSG-RAN WG3 Meeting #107-e, R3-200494, Feb. 24-Mar. 6, 2020, 28 pages.
Nokia et al., "Cell related parameter exchange," 3GPP TSG-RAN WG3 Meeting #98, R3-174365, Reno, USA, Nov. 27-Dec. 1, 2017, 10 pages.
Office Action issued in Chinese Application No. 201910224315.7 dated Mar. 22, 2022, 4 pages.
Park et al., "Improving Frequency Multiplexing of Random Access Resources for TDD System Enhancement," 2016 Eighth International Conference on Ubiquitous and Future Networks (ICUFN), Jul. 2016, 6 pages.
Samsung, KT, "System information transmission over F1," 3GPP TSG-RAN WG3 Meeting #97, R3-172950, Berlin, Germany, Aug. 21-25, 2017, 4 pages.
Sen et al., "Impact of 5G Wireless Network Architecture on Transport Network," ZTE Technology Journal, vol. 24, No. 1, Feb. 2018, 7 pages (with English abstract).
Zhuang et al., "Discussion on 5G Network Access Optimization," Telecommunications Technology Journal, Dec. 15, 2019, 7 pages (with English abstract).

* cited by examiner

COMMUNICATION METHOD AND APPARATUS

CROSS-REFERENCE TO RELATED APPLICATIONS

This application is a continuation of International Application No. PCT/CN2020/078451, filed on Mar. 9, 2020, which claims priority to Chinese Patent Application No. 201910224315.7, filed on Mar. 22, 2019. The disclosures of the aforementioned applications are hereby incorporated by reference in their entireties.

TECHNICAL FIELD

This application relates to the field of communication technologies, and in particular, to a communication method and apparatus.

BACKGROUND

A random access conflict may occur in a random access procedure. The random access conflict may cause a random access failure, increasing a random access delay.

In a new radio (new radio, NR for short) system, a base station may have a split architecture. To be specific, the base station includes two parts: a central unit (central unit, CU for short) and a distributed unit (distributed unit, DU for short). One CU may be connected to a plurality of DUs, and a random access channel (random access channel, RACH for short) configuration of a cell supported by a DU is located in the DU. For a split base station architecture, how to reduce a quantity of random access failures of a terminal is a problem worth researching.

SUMMARY

Embodiments of this application provide a communication method and apparatus, to improve a random access success rate in a split base station architecture.

To achieve the foregoing objective, the embodiments of this application provide the following technical solutions.

According to a first aspect, a communication method is provided. The method includes: A first CU obtains PRACH configuration information of N cells, and sends the PRACH configuration information of the N cells to a first DU, where N is an integer greater than 0. The first CU may be any CU, and the first DU may be any DU connected to the first CU.

According to the method provided in the first aspect, a CU may send, to a DU, PRACH configuration information of the N cells that is obtained by the CU, so that the DU performs random access optimization based on the obtained PRACH configuration information of the cells. In this way, random access optimization can be performed in a split base station architecture, so that random access conflicts are reduced and a random access success rate in the split base station architecture is increased.

In a possible implementation, the N cells include a neighbour cell of a target cell, and the target cell is a cell supported by the first DU. In this possible implementation, because interference between the neighbor cell of the target cell and the target cell is relatively strong, random access optimization performed by using a PRACH configuration of the neighbor cell of the target cell can improve random access optimization efficiency, and effectively reduce random access conflicts.

In a possible implementation, the N cells further include a neighbor cell of the neighbor cell of the target cell. In this possible implementation, because interference between the neighbor cell of the neighbor cell of the target cell and the target cell is also relatively strong, random access optimization performed by using PRACH configuration information of the neighbor cell of the neighbor cell of the target cell can improve random access optimization efficiency, and effectively reduce random access conflicts.

In a possible implementation, the target cell is a cell in which a random access failure occurs on a terminal in a random access procedure. In this possible implementation, when a random access failure occurs on the terminal in a cell, it indicates that there is a high probability that PRACH configuration information of the cell conflicts with that of another cell. In this case, random access optimization may be performed.

In a possible implementation, the N cells include a cell conflicting with PRACH configuration information of the target cell. In this possible implementation, a DU may directly perform random access optimization based on the N cells without needing to perform random access reconfiguration on the terminal, thereby avoiding increasing power consumption of the terminal.

In a possible implementation, before the first CU sends the PRACH configuration information of the N cells to the first DU, the method further includes: The first CU performs conflict detection on PRACH configuration information, where the N cells include a cell conflicting with PRACH configuration information of the first DU. In this possible implementation, a DU may directly perform random access optimization based on the N cells without needing to perform random access reconfiguration on the terminal, thereby avoiding increasing power consumption of the terminal.

In a possible implementation, that a first CU obtains PRACH configuration information of N cells includes: The first CU obtains the PRACH configuration information of the N cells from OAM; the first CU receives the PRACH configuration information of the N cells that is sent by a second DU; the first CU receives the PRACH configuration information of the N cells that is sent by a second CU; or the first CU receives the PRACH configuration information of the N cells that is sent by a second CU and a second DU. In this possible implementation, a plurality of methods for obtaining the PRACH configuration information of the N cells are provided, so that this application can be applied to different application scenarios.

In a possible implementation, the method further includes: The first CU sends an RACH report of the terminal to the first DU, where the RACH report includes random access failure information of the terminal in the random access procedure in the target cell. In this possible implementation, a DU may determine, based on an RACH report, whether a random access failure occurs.

In a possible implementation, the method further includes: The first CU sends, to the first DU, information about distances between the N cells and the target cell. Because interference between a cell that is closer to the target cell and the target cell is stronger, in this possible implementation, a DU may perform random access optimization based on the information about distances between the N cells and the target cell, so that random access optimization efficiency is improved.

In a possible implementation, the PRACH configuration information includes one or more of the following information: a root sequence index, a zero correlation zone configuration, a high speed flag, a frequency offset, and a configuration index.

According to a second aspect, a communication method is provided. The method includes: A first DU receives PRACH configuration information of N cells from a first CU, and performs random access optimization based on the PRACH configuration information of the N cells, where N is an integer greater than 0. The first CU may be any CU, and the first DU may be any DU connected to the first CU.

According to the method provided in the second aspect, a CU may send, to a DU, PRACH configuration information of the N cells that is obtained by the CU, so that the DU performs random access optimization based on the obtained PRACH configuration information of the cells. In this way, random access optimization can be performed in a split base station architecture, so that random access conflicts are reduced, and a random access success rate in the split base station architecture is increased.

In a possible implementation, the N cells include a neighbor cell of a target cell, and the target cell is a cell supported by the first DU. In this possible implementation, because interference between the neighbor cell of the target cell and the target cell is relatively strong, random access optimization performed by using a PRACH configuration of the neighbor cell of the target cell can improve random access optimization efficiency, and effectively reduce random access conflicts.

In a possible implementation, the N cells further include a neighbor cell of the neighbor cell of the target cell. In this possible implementation, because interference between the neighbor cell of the neighbor cell of the target cell and the target cell is also relatively strong, random access optimization performed by using PRACH configuration information of the neighbor cell of the neighbor cell of the target cell can improve random access optimization efficiency, and effectively reduce random access conflicts.

In a possible implementation, the target cell is a cell in which a random access failure occurs on a terminal in a random access procedure. In this possible implementation, when a random access failure occurs on the terminal in a cell, it indicates that there is a high probability that PRACH configuration information of the cell conflicts with that of another cell. In this case, random access optimization may be performed.

In a possible implementation, the N cells include a cell conflicting with PRACH configuration information of the target cell. In this possible implementation, a DU may directly perform random access optimization based on the N cells without needing to perform random access reconfiguration on the terminal, thereby avoiding increasing power consumption of the terminal.

In a possible implementation, before the first DU performs random access optimization based on the PRACH configuration information of the N cells, the method further includes: The first DU performs conflict detection on PRACH configuration information, and determines that the PRACH configuration information of the N cells conflicts with the PRACH configuration information of the target cell; and/or the first DU receives an RACH report of the terminal from the first CU, where the RACH report includes random access failure information of the terminal in the random access procedure in the target cell; and the first DU determines, based on the RACH report, that a random access failure occurs on the terminal in the random access procedure in the target cell.

In a possible implementation, the method further includes: The first DU receives, from the first CU, information about distances between the N cells and the target cell. In this possible implementation, the first DU may select to perform random access optimization based on the information about distances between the N cells and the target cell, so that random access optimization efficiency is improved.

In a possible implementation, that the first DU performs random access optimization based on the PRACH configuration information of the N cells includes: The first DU performs random access optimization based on the distances between the N cells and target cell and the PRACH configuration information of the N cells. In this possible implementation, the first DU may perform random access optimization based on the information about distances between the N cells and the target cell, so that random access optimization efficiency is improved.

In a possible implementation, that the first DU performs random access optimization based on the PRACH configuration information of the N cells includes: The first DU adjusts the PRACH configuration information of the target cell to make the PRACH configuration information of the target cell not conflict with PRACH configuration information of some or all cells in the N cells.

In a possible implementation, the PRACH configuration information includes one or more of the following information: a root sequence index, a zero correlation zone configuration, a high speed flag, a frequency offset, and a configuration index.

According to a third aspect, a communication apparatus is provided. The communication apparatus includes a processing unit and a communication unit. The processing unit is configured to obtain PRACH configuration information of N cells, where N is an integer greater than 0. The communication unit is configured to send the PRACH configuration information of the N cells to a first DU.

In a possible implementation, the N cells include a neighbor cell of a target cell, and the target cell is a cell supported by the first DU.

In a possible implementation, the N cells further include a neighbor cell of the neighbor cell of the target cell.

In a possible implementation, the target cell is a cell in which a random access failure occurs on a terminal in a random access procedure.

In a possible implementation, the N cells include a cell conflicting with PRACH configuration information of the target cell.

In a possible implementation, the processing unit is further configured to perform conflict detection on PRACH configuration information, where the N cells include a cell conflicting with PRACH configuration information of the first DU.

In a possible implementation, the processing unit is specifically configured to: obtain the PRACH configuration information of the N cells from OAM; receive, by using the communication unit, the PRACH configuration information of the N cells that is sent by a second DU; receive, by using the communication unit, the PRACH configuration information of the N cells that is sent by a second CU; or receive, by using the communication unit, the PRACH configuration information of the N cells that is sent by a second CU and a second DU.

In a possible implementation, the communication unit is further configured to send an RACH report of the terminal to the first DU, where the RACH report includes random access failure information of the terminal in the random access procedure in the target cell.

In a possible implementation, the communication unit is further configured to send, to the first DU, information about distances between the N cells and the target cell.

In a possible implementation, the PRACH configuration information includes one or more of the following information: a root sequence index, a zero correlation zone configuration, a high speed flag, a frequency offset, and a configuration index.

According to a fourth aspect, a communication apparatus is provided. The communication apparatus includes a processing unit and a communication unit. The communication unit is configured to receive PRACH configuration information of N cells from a first CU, where N is an integer greater than 0. The processing unit is configured to perform random access optimization based on the PRACH configuration information of the N cells.

In a possible implementation, the N cells include a neighbor cell of a target cell, and the target cell is a cell supported by the apparatus.

In a possible implementation, the N cells further include a neighbor cell of the neighbor cell of the target cell.

In a possible implementation, the target cell is a cell in which a random access failure occurs on a terminal in a random access procedure.

In a possible implementation, the N cells include a cell conflicting with PRACH configuration information of the target cell.

In a possible implementation, the processing unit is further configured to perform conflict detection on PRACH configuration information, to determine that the PRACH configuration information of the N cells conflicts with the PRACH configuration information of the target cell; and/or the communication unit is further configured to receive an RACH report of the terminal from the first CU, where the RACH report includes random access failure information of the terminal in the random access procedure in the target cell: and the processing unit is further configured to determine, based on the RACH report, that a random access failure occurs on the terminal in the random access procedure in the target cell.

In a possible implementation, the communication unit is further configured to receive information about distances between the N cells and the target cell from the first CU.

In a possible implementation, the processing unit is specifically configured to perform random access optimization based on the distances between the N cells and the target cell and the PRACH configuration information of the N cells.

In a possible implementation, the processing unit is specifically configured to adjust the PRACH configuration information of the target cell to make the PRACH configuration information of the target cell not conflict with PRACH configuration information of some or all cells in the N cells.

In a possible implementation, the PRACH configuration information includes one or more of the following information: a root sequence index, a zero correlation zone configuration, a high speed flag, a frequency offset, and a configuration index.

According to a fifth aspect, a communication apparatus is provided. The communication apparatus includes a processor. The processor is connected to a memory. The memory is configured to store computer-executable instructions, and the processor executes the computer-executable instructions stored in the memory, to implement any method provided in the first aspect or the second aspect. The memory and the processor may be integrated together, or may be independent devices. If the memory and the processor may be independent devices, the memory may be located inside the communication apparatus, or may be located outside the communication apparatus.

In a possible implementation, the processor includes a logic circuit and an input interface and/or an output interface. The output interface is configured to perform a sending action in a corresponding method, and the input interface is configured to perform a receiving action in a corresponding method.

In a possible implementation, the communication apparatus further includes a communication interface and a communication bus. The processor, the memory, and the communication interface are connected by using the communication bus. The communication interface is configured to perform receiving and sending actions in a corresponding method. The communication interface may also be referred to as a transceiver. Optionally, the communication interface includes a transmitter and a receiver. In this case, the transmitter is configured to perform a sending action in a corresponding method, and the receiver is configured to perform a receiving action in a corresponding method.

In a possible implementation, the communication apparatus exists in a product form of a chip.

According to a sixth aspect, a communication system is provided. The communication system includes the communication apparatuses provided in the third aspect and the fourth aspect. Optionally, the communication system further includes a terminal.

According to a seventh aspect, a computer-readable storage medium is provided. The computer-readable storage medium includes instructions. When the instructions are run on a computer, the computer is enabled to perform any method provided in the first aspect or the second aspect.

According to an eighth aspect, a computer program product including instructions is provided. When the instructions are run on a computer, the computer is enabled to perform any method provided in the first aspect or the second aspect.

For technical effects brought by any implementation in the third aspect to the eighth aspect, refer to technical effects brought by corresponding implementations in the first aspect or the second aspect. Details are not described herein again.

It should be noted that various possible implementations of any one of the foregoing aspects may be combined provided that the solutions are not contradictory.

DESCRIPTION OF EMBODIMENTS

Figure 1:
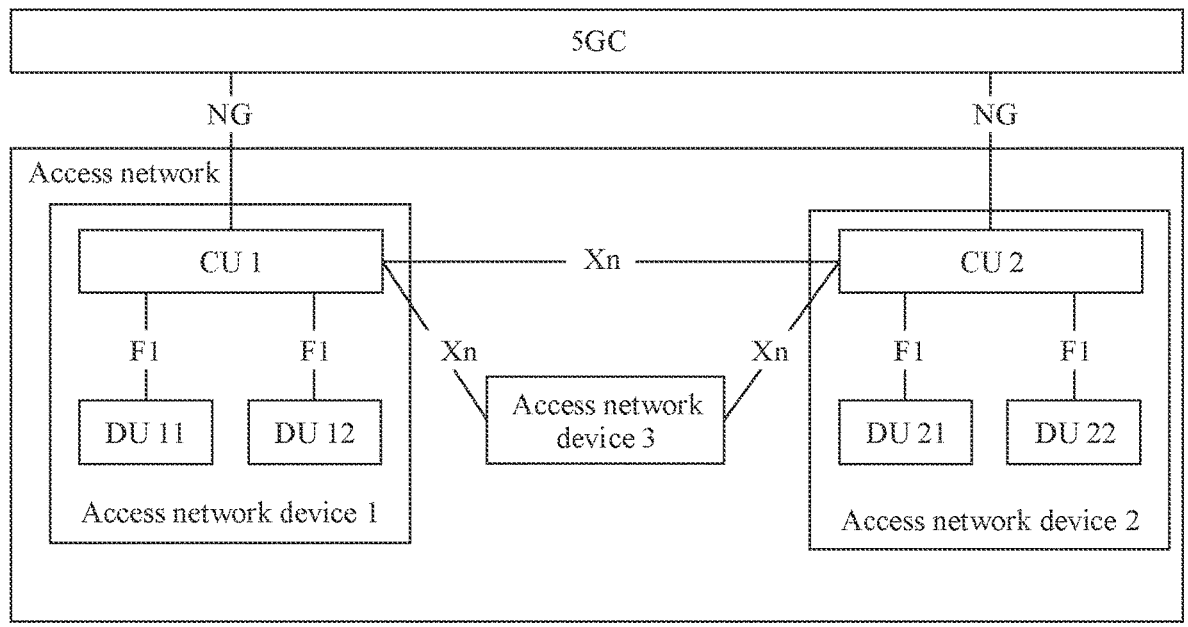
FIG. 1 is a schematic composition diagram of a network architecture according to an embodiment of this application.

The following describes technical solutions in embodiments of this application with reference to the accompanying drawings in the embodiments of this application. In the descriptions of this application, unless otherwise specified, "/" means "or". For example, A/B may represent A or B. "And/or" in this specification describes an association relationship for describing associated objects and represents that there may be three relationships. For example, A and/or B may represent the following three cases: Only A exists, both A and B exist, and only B exists. In addition, unless otherwise specified, "a plurality of" in the descriptions of this application means two or more.

The technical solutions in the embodiments of this application may be applied to various communication systems, for example, an orthogonal frequency division multiple access (orthogonal frequency-division multiple access, OFDMA) system, a single-carrier frequency-division multiple access (single carrier frequency-division multiple access, SC-FDMA), and another system. The terms "system" and "network" can be interchanged with each other. A radio technology such as evolved universal terrestrial radio access (evolved universal terrestrial radio access, E-UTRA for short) or ultra mobile broadband (ultra mobile broadband, UMB for short) may be implemented in an OFDMA system. E-UTRA is an evolved version of a universal mobile telecommunications system (universal mobile telecommunications system, UMTS for short). The 3rd generation partnership project (3rd generation partnership project, 3GPP for short) uses a new version of E-UTRA in long term evolution (long term evolution, LTE for short) and various versions evolved based on LTE. A 5th generation (5th-generation, 5G for short) communication system and NR are next-generation communication systems that are under research. In addition, the communication systems may further be applicable to a future-oriented communication technology, and are applicable to the technical solutions provided in the embodiments of this application.

Network elements in the embodiments of this application include an access network device and a terminal.

The terminal may also be referred to as user equipment (user equipment, UE for short), a terminal device, an access terminal, a subscriber unit, a subscriber station, a mobile station, a remote station, a remote terminal, a mobile device, a user terminal, a wireless communication device, a user agent, a user apparatus, or the like. The terminal may be an unmanned aerial vehicle, an internet of things (internet of things, IoT for short) device (for example, a sensor, an electricity meter, or a water meter), a vehicle-to-everything (vehicle-to-everything, V2X for short) device, a station (station, ST for short) in a wireless local area network (wireless local area networks, WLAN for short), a cellular phone, a cordless phone, a session initiation protocol (session initiation protocol, SIP for short) phone, a wireless local loop (wireless local loop, WLL for short) station, a personal digital assistant (personal digital assistant, PDA for short) device, a handheld device having a wireless communication function, a computing device or another processing device connected to a wireless modem, a vehicle-mounted device, or a wearable device (which may also be referred to as a wearable intelligent device). The terminal may alternatively be a terminal in a next generation communication system, for example, a terminal in a 5G communication system, a terminal in a future evolved public land mobile network (public land mobile network, PLMN for short), or a terminal in an NR communication system.

The access network device may be macro base stations, micro base stations (which are also referred to as small cells), relay stations, access points (access point, AP for short), and the like in various forms, or may include control nodes in various forms, for example, a network controller. The control node may be connected to a plurality of base stations, and configure resources for a plurality of terminals covered by the plurality of base stations. In systems using different radio access technologies, a device having a base station function may have different names. For example, the device may be referred to as a base transceiver station (base transceiver station, BTS for short) in a global system for mobile communications (global system for mobile communication, GSM for short) or code division multiple access (code division multiple access, CDMA for short) network, may be referred to as a NodeB (NodeB) in wideband code division multiple access (wideband code division multiple access, WCDMA for short), may be referred to as an evolved NodeB (evolved NodeB, eNB or eNodeB for short) or an en-gNB in an LTE system, or may be referred to as a next generation node base station (next generation node base station, gNB for short) or an ng-eNB in a 5G communication system or an NR communication system. A specific name of the base station is not limited in this application. The gNB or the en-gNB provides protocols and functions of a user plane and control plane of NR for the terminal, and the eNB or the ng-eNB provides protocols and functions of a user plane and control plane of E-UTRA for the terminal. Alternatively, the access network device may be a radio controller in a cloud radio access network (cloud radio access network, CRAN for short) scenario, an access network device in a future evolved PLMN network, a transmission reception point (transmission and reception point, TRP for short), or the like.

In the communication standard of R15, for an NR access network device (for example, a gNB or a next-generation evolved base station (namely, ng-eNB)), a split architecture is defined. To be specific, an access network device is divided into two parts, a CU and a DU, based on protocol stack functions. The CU has functions of a service data adaptation protocol (service data adaptation protocol, SDAP for short) layer, a packet data convergence protocol (packet data convergence protocol, PDCP for short) layer, and a radio resource control (radio resource control, RRC for short) layer. The DU has functions of a radio link control (radio link control, RLC for short) layer, a media access control (medium access control, MAC for short) layer, and a physical (Physical, PHY for short) layer.

One access network device may include one CU and a plurality of DUs, and the CU and the DUs are connected by using an F1 interface. The CU is connected to another access network device by using an Xn interface. The CU is connected to a core network (5G core, 5GC for short) of a 5G communication network by using an NG interface. It is specified in the standard that one CU may be connected to a plurality of DUs, and one DU can be connected to only one CU. In an implementation process, in consideration of system stability, one DU may be connected to a plurality of CUs. An access network includes a plurality of access network devices. The plurality of access network devices may each use a split architecture, or use a centralized architecture (namely, an access network device that is not divided into two parts: a CU and a DU), or may partially use a split architecture and partially use a centralized architecture. For example, referring to FIG. 1, an access network device 1 and an access network device 2 use a split architecture, and an access network device 3 uses a centralized architecture. A DU and an access network device may support one cell, or may support a plurality of cells. For example, referring to Table 1, Table 1 shows a correspondence among DUs, access network devices, and supported cells in the network architecture shown in FIG. 1.

TABLE 1

| Access network device | | Access network device 2 | | Access network device 3 |
|---|---|---|---|---|
| DU 11 | DU 12 | DU 21 | DU 22 | |
| Cell 1 and cell 2 | Cell 3 | Cell 4 | Cell 5 and cell 6 | Cell 7, cell 8, and cell 9 |

A system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

To make the embodiments of this application clearer, the following briefly describes some content related to the embodiments of this application.

1. Random Access

After a cell search procedure, a terminal already achieves the downlink synchronization with a cell. Therefore, the terminal can receive downlink data. However, the terminal can perform uplink transmission only after achieving uplink synchronization with the cell. Specifically, the terminal may establish a connection to the cell by using a random access procedure (random access procedure), and achieve the uplink synchronization.

Figure 2:
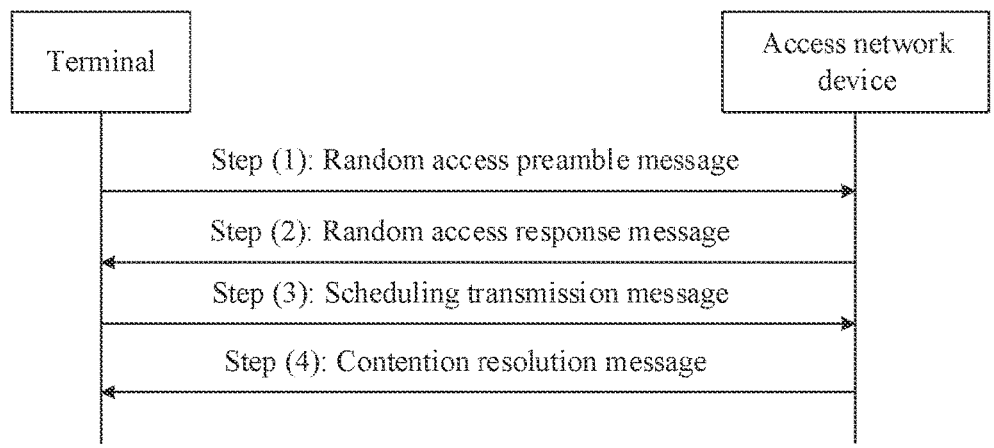
FIG. 2 is a flowchart of random access according to an embodiment of this application.

For contention-based random access, an entire procedure of the contention-based random access includes four steps. Referring to FIG. 2, the four steps are the following steps (1) to (4).

Step (1): A terminal sends a random access preamble message to an access network device, where the message includes a random access preamble (or referred to as a random access preamble sequence, which is referred to as a preamble for short below, or may also be referred to as a preamble sequence). A main purpose of sending the preamble is to notify the access network device that there is a random access request, and enable the access network device to estimate a transmission delay between the access network device and the terminal. An estimated value of the transmission delay is used to adjust an uplink sending time point of the terminal in step (2).

During specific implementation of step (1), the access network device notifies, by broadcasting system information, all terminals of a time-frequency resource on which transmission of a preamble is allowed. Each cell has a plurality of preambles, and the terminal selects (or the access network device specifies) one of the plurality of preambles for transmission on a physical random access channel (physical random access channel, PRACH for short).

The random access preamble message may also be referred to as a message1 (message1, MSG1 for short).

Step (2). The access network device sends a random access response message to the terminal, where the message includes one or more of the following information: an index value of a preamble detected by the access network device, indicating random access for which the response is valid; a scheduling indication, used to indicate a time-frequency resource used when the terminal sends a message in step (3); and a temporary C-RNTI (temporary C-RNTI, TC-RNTI for short), used for further communication between the terminal and a network side, for example, decoding, based on the TC-RNTI, data sent by the network side. The C-RNTI is short for cell radio network temporary identifier (cell radio network temporary identifier).

The random access response message may also be referred to as a message2 (message2, MSG2 for short).

Step (3): The terminal sends a scheduling transmission message to the access network device, where the scheduling transmission message is an exact random access procedure message (also referred to as a payload), for example, an RRC connection request or a tracking area update. The scheduling transmission message includes the TC-RNTI allocated to the terminal in step (2) and an initial terminal identity (initial UE identity) or a C-RNTI.

The scheduling transmission message may also be referred to as a message3 (message3, MSG3 for short).

When a random access conflict exists, conflicting terminals receive the same TC-RNTI in step (2). In this case, when the conflicting terminals send payloads, the conflicting terminals use a same uplink time-frequency resource. Consequently, the conflicting terminals interfere with each other. In addition, because the conflicting terminals use the same TC-RNTI to decode data, the conflicting terminals cannot correctly decode the data. To avoid this case, the access network device needs to determine, in the conflicting terminals, a terminal that succeeds in contention, namely, a terminal whose access is allowed.

Step (4): The access network device sends a contention resolution message to the terminal, where the message includes the initial terminal identity in step (3). After receiving the contention resolution message, the terminal has three possible behaviors: Behavior 1: If the terminal correctly decodes the contention resolution message and detects an initial terminal identity of the terminal, the terminal feeds back a positive acknowledgment to the access network device. Behavior 2: If the terminal correctly decodes the contention resolution message and detects that the message includes another initial terminal identity, it indicates that the conflict is not resolved, and in this case, the terminal does not provide a feedback. Behavior 3: If the terminal fails to decode the contention resolution message or misses a downlink grant signal, the terminal does not provide a feedback.

When the terminal performs the behavior 1, random access of the terminal succeeds. When the terminal performs the behavior 2 or the behavior 3, random access of the terminal fails. When the random access of the terminal fails, the terminal subsequently may continue to initiate random access.

The contention resolution message may also be referred to as a message4 (message4, MSG4 for short).

2. RACH configuration

An RACH configuration of a cell is used to indicate a parameter configuration of a resource allowed to be used by a terminal during random access to the cell.

The RACH configuration may include one or more of the following configurations: a PRACH configuration, a preamble group, a backoff parameter, a transmit power control parameter, and the like.

A preamble of a cell may be divided into a plurality of preamble subsets. The preamble group is used to indicate a quantity of elements in each preamble subset. The backoff parameter is used to indicate waiting time for the terminal to receive the random access response message. The transmit power control parameter is used to indicate a power ramping step value when the terminal retransmits the random access preamble message.

3. PRACH Configuration

The PRACH configuration is used to indicate a PRACH resource in a cell, and the PRACH resource is used by the terminal to perform random access in the cell.

PRACH configuration information may include one or more of the following information: a root sequence index (root sequence index), a zero correlation zone configuration (zero correlation zone configuration), a high speed flag (high speed flag), a frequency offset (PRACH-frequency offset), and a configuration index (PRACH-configuration index).

A preamble in a preamble set available to the cell is generated by performing cyclic shift on one or more root Zadoff-Chu sequences (ZC sequence for short). A logical sequence number of a start root sequence of root sequences used by the cell is configured by using a parameter, a root sequence index. After the value of the parameter, root sequence index, is determined, the root sequence used by the cell is determined. If values of root sequence indexes of two cells are different, root sequences used by the two cells are different, and preambles available to the two cells are different. For example, a value of a root sequence index of a cell 1 is 1, and a value of a root sequence index of a cell 2 is 2. In this case, a ZC sequence used for generating a preamble in the cell 1 is a ZC sequence corresponding to a root sequence index whose value is 1 in a root sequence index comparison table, and a ZC sequence used for generating a preamble in the cell 2 is a ZC sequence corresponding to a root sequence index whose value is 2 in the root sequence index comparison table.

The zero correlation zone configuration is used to configure an index value, where the index value is used to indicate a cyclic shift used when a preamble is generated. After the value of the zero correlation zone configuration is determined, the cyclic shift used when the preamble is generated is determined, and then a preamble available to a cell is determined. When two cells use a same root sequence to generate preambles, preambles available to the two cells are different if different zero correlation zone configurations are used.

The high speed flag is a parameter used to determine whether a cell is a high-speed cell. A root sequence used when a high-speed cell generates a preamble is different from a root sequence used when a non-high-speed cell generates a preamble. For example, the cell 1 is a high-speed cell, the cell 2 is a non-high-speed cell, and root sequences used when the two cells generate preambles are different. Therefore, preambles available to the two cells are different.

The frequency offset is used to indicate an index of the first resource block (resource block, RB for short) used by the terminal to send a preamble. For example, a frequency offset of the cell 1 is 1, and a frequency offset of the cell 2 is 2. In this case, a start RB used to transmit the preamble in the cell 1 is an RB 1, and an RB used to transmit the preamble in the cell 2 is an RB 2.

The configuration index is used to indicate a time-frequency resource and a preamble format used by the terminal to send a preamble. For example, a configuration index of the cell 1 is 1, and a configuration index of the cell 2 is 2. In this case, a time-frequency resource used to transmit the preamble in the cell 1 is a time-frequency resource corresponding to a configuration index whose value is 1 in a random access configuration index comparison table, and a time-frequency resource used to transmit the preamble in the cell 2 is a time-frequency resource corresponding to a configuration index whose value is 2 in the random access configuration index comparison table. When two cells use different configuration indexes, time-frequency resources used by the two cells to transmit the preambles are different.

4. RACH Report

The terminal may send an RACH report to the access network device when random access succeeds or the access network device has a requirement. The RACH report is used by the terminal to report related information in a random access procedure.

The RACH report may include random access failure information of the terminal in the random access procedure in a cell. Specifically, information about a quantity of times that the terminal sends the preamble in the random access procedure in the cell and information about whether the terminal detects contention may be included. The random access procedure is an entire procedure from initiating random access by the terminal to a random access success.

The information about a quantity of times that the terminal sends the preamble is used to indicate a quantity of times that the terminal sends the preamble when the terminal successfully completes a random access procedure most recently. For example, if the terminal fails to complete the random access procedure in the first nine times and successfully completes the random access procedure in the tenth time, the quantity of times that the terminal sends the preamble is 10. The information about whether the terminal detects contention is used to indicate whether the terminal detects existence of contention on at least one preamble in sent preambles.

5. Neighbor Cell

If no other cell exists between two cells, the two cells are adjacent cells. One cell may be referred to as a neighbor cell of the other cell. The neighbor cell may be referred to as a neighbor cell for short.

Figure 3:
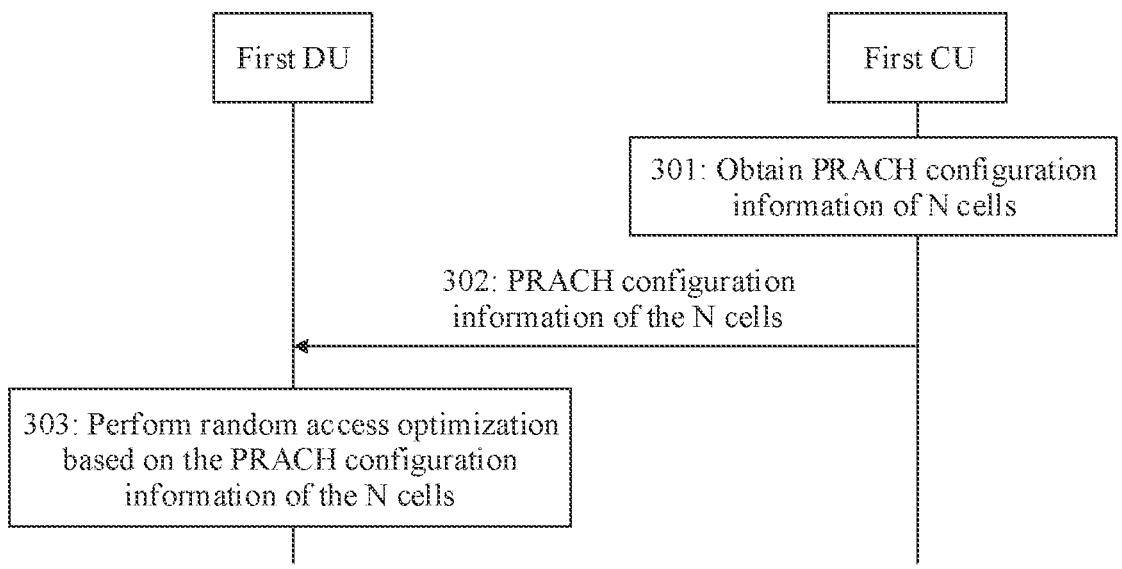
FIG. 3 is a flowchart of a communication method according to an embodiment of this application.

An embodiment of this application provides a communication method. As shown in FIG. 3, the following steps are included.

301: A first unit CU obtains PRACH configuration information of N cells, where N is an integer greater than 0.

The first CU may be any CU, and a first DU may be any DU connected to the first CU.

The N cells may be one or more cells other than a cell supported by the first DU. For example, the N cells may be one or more cells supported by a DU connected to a second CU (where the second CU is a CU other than the first CU); the N cells may be one or more cells supported by a second DU (where the second DU is a DU that is connected to the first CU and that is other than the first DU); or the N cells may be a plurality of cells including a cell supported by a DU connected to a second CU and a cell supported by a second DU.

Optionally, the PRACH configuration information includes one or more of the following information: a root sequence index, a zero correlation zone configuration, a high speed flag, a frequency offset, and a configuration index. For specific meanings of the information, refer to the foregoing descriptions. Details are not described herein again.

Figure 4:
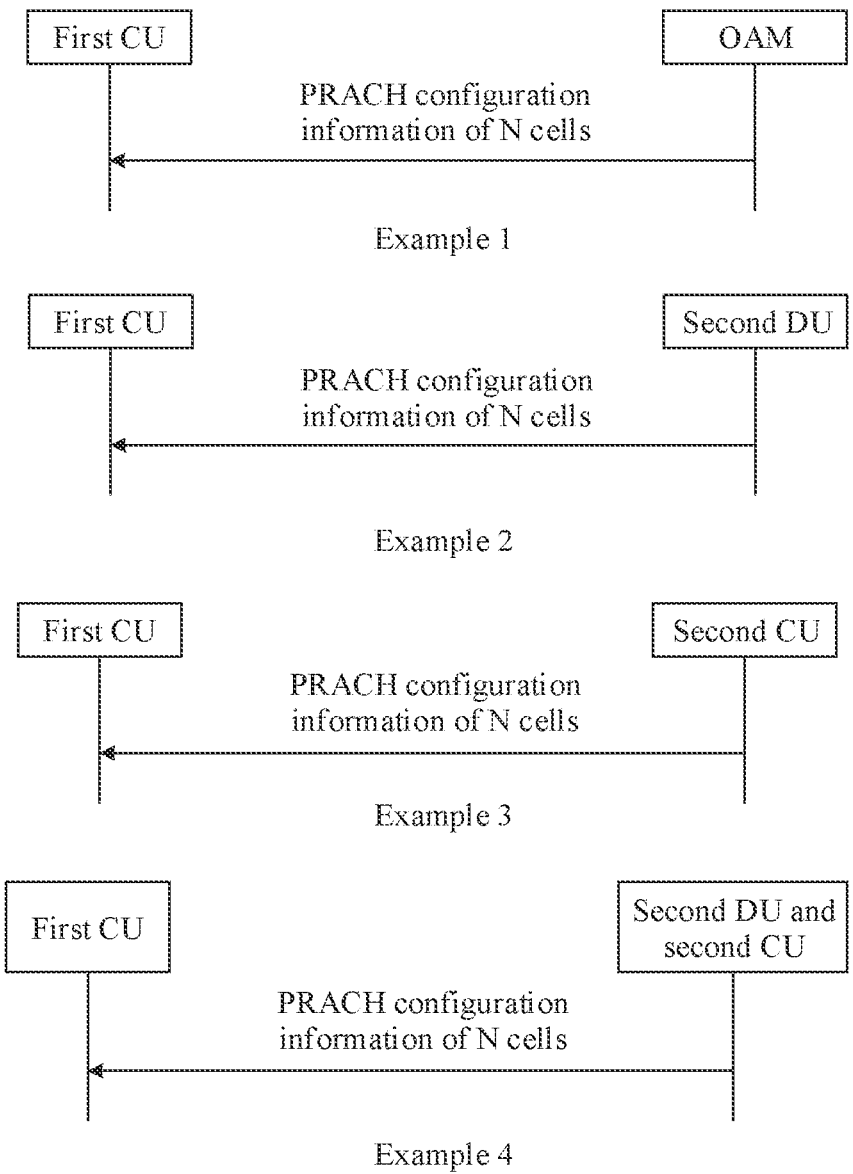
FIG. 4 is a schematic diagram of an example in which a first DU obtains PRACH configuration information of N cells according to an embodiment of this application.

Referring to FIG. 4, step 301 may be implemented in any one or more manners shown in the following example 1 to example 4.

Example 1: The first CU obtains the PRACH configuration information of the N cells from operation, administration, and maintenance (operation administration and maintenance, OAM for short).

In the example 1, the OAM may store PRACH configuration information of a cell supported by each DU, and the first CU may obtain, by interacting with the OAM, PRACH configuration information of a cell supported by a corresponding DU. The first CU may obtain, from the OAM, PRACH configuration information of a cell supported by the second DU, and/or PRACH configuration information of a cell supported by each DU connected to the second CU.

Example 2: The first CU receives the PRACH configuration information of the N cells that is sent by the second DU.

In the example 2, the second DU may report, to the first CU by using an F1 interface, PRACH configuration information of each cell supported by the second DU. In this case, the N cells are one or more cells supported by the second DU.

Example 3: The first CU receives the PRACH configuration information of the N cells that is sent by the second CU.

In the example 3, the first CU may interact with the second CU by using an Xn interface, to obtain PRACH configuration information of a cell supported by each DU connected to the second CU. In this case, the N cells are one or more cells supported by a DU connected to the second CU.

Example 4: The first CU receives the PRACH configuration information of the N cells that is sent by the second CU and the second DU.

The example 4 is a combination of the methods in the example 2 and the example 3. It should be noted that, when the N cells are a plurality of cells including a cell supported by a DU connected to the second CU and a cell supported by the second DU, the first CU may obtain the PRACH configuration information of the N cells by using the method shown in the example 1 or the example 4.

302: The first CU sends the PRACH configuration information of the N cells to the first DU. Correspondingly, the first DU receives the PRACH configuration information of the N cells from the first CU.

303: The first DU performs random access optimization based on the PRACH configuration information of the N cells. For example, the first DU adjusts, based on the PRACH configuration information of the N cells, PRACH configuration information of a cell supported by the first DU.

It should be noted that, after receiving the PRACH configuration information of the N cells, the first DU may immediately perform random access optimization, or may first store the PRACH configuration information of the N cells, and subsequently perform random access optimization when required.

For a split base station architecture, there is no direct communication interface between DUs, and a DU cannot directly learn of PRACH configuration information of a cell supported by another DU. In addition, a terminal sends an RACH report by using an RRC message. In other words, the terminal can send the RACH report only to the CU, but cannot send the RACH report to the DU. The DU cannot determine whether random access of the terminal fails. In the method provided in this embodiment of this application, a CU may send a PRACH configuration of another cell to a DU, so that the DU may perform random access optimization based on the PRACH configuration of the another cell. In this way, random access optimization can be performed in a split base station architecture, so that random access conflicts are reduced, and a random access success rate in the split base station architecture is increased.

Optionally, the N cells include a neighbor cell of a target cell, and the target cell is a cell supported by the first DU. Because interference between the neighbor cell of the target cell and the target cell is relatively strong, random access optimization performed by using a PRACH configuration of the neighbor cell of the target cell can improve random access optimization efficiency, and effectively reduce random access conflicts.

Optionally, the N cells further include a neighbor cell of the neighbor cell of the target cell. Because interference between the neighbor cell of the neighbor cell of the target cell and the target cell is also stronger than interference between the neighbor cell of the neighbor cell of the target cell and a remoter cell, random access optimization performed by using PRACH configuration information of the neighbor cell of the neighbor cell of the target cell can improve random access optimization efficiency, and effectively reduce random access conflicts.

Optionally, the target cell is a cell in which a random access failure occurs on the terminal in a random access procedure. The target cell may alternatively be any cell supported by the first DU. The random access procedure is an entire procedure from initiating random access by the terminal to a random access success.

Optionally, during specific implementation, step 303 includes: (11) The first DU adjusts PRACH configuration information of the target cell to make the PRACH configuration information of the target cell not conflict with PRACH configuration information of some or all cells in the N cells.

That PRACH configuration information of a cell does not conflict with PRACH configuration information of another cell means that there is no same preamble in an available preamble determined by the terminal based on the PRACH configuration information of the cell and an available preamble determined by the terminal based on the PRACH configuration information of the another cell, and/or time-frequency resources used by the terminal to transmit a same preamble in the two cells are different. That PRACH configuration information of a cell conflicts with PRACH configuration information of another cell means that there is a same preamble in an available preamble determined by the terminal based on the PRACH configuration information of the cell and an available preamble determined by the terminal based on the PRACH configuration information of the another cell, and/or time-frequency resources used by the terminal to transmit a same preamble in the two cells are the same.

Specifically, when adjusting the PRACH configuration information of the target cell, the first DU may adjust one or more of the following: adjusting the root sequence index; adjusting the zero correlation zone configuration; adjusting a high speed flag indication; adjusting the frequency offset; or adjusting the configuration index. The first DU adjusts the PRACH configuration information of the target cell, so that a preamble used by the terminal in the target cell is different from a preamble used in another cell, and/or time-frequency resources used by the terminal to transmit a same preamble in different cells are different. The former may be implemented by adjusting one or more of the root sequence index, the zero correlation zone configuration, and the high speed flag indication, and the latter may be implemented by adjusting one or more of the frequency offset and the configuration index.

Optionally, the method further includes: (21) The first CU sends, to the first DU, information about distances between the N cells and the target cell. Correspondingly, the first DU receives the information about distances between the N cells and the target cell from the first CU.

In this case, during specific implementation, step 303 may include: The first DU performs random access optimization based on the distances between the N cells and the target cell and the PRACH configuration information of the N cells.

The information about distances between the N cells and the target cell that is sent by the first CU to the first DU and the PRACH configuration information of the N cells may be included in a same message for sending, or may be included in different messages for sending.

It should be noted that, during specific implementation of step 303, the first DU may not be able to adjust the PRACH configuration information of the target cell to make the PRACH configuration information of the target cell not conflict with the PRACH configuration information of all cells in the N cells. In this case, the first DU may adjust the PRACH configuration information of the target cell based on the distances between the N cells and the target cell, so that the PRACH configuration information of the target cell does not conflict with the PRACH configuration information of some cells in the N cells. The some cells may be several cells that are in the N cells and that are closest to the target cell, to reduce as much as possible a probability that terminals that are relatively close to each other use a same preamble, and/or a probability that terminals that are relatively close to each other use a same time-frequency resource to transmit a same preamble.

The first CU may indicate the information about distances between the N cells and the target cell by using the following example 1, example 2, or example 3.

Example 1: Indicate a cell type of each cell in the N cells.

The cell type means whether the cell is a neighbor cell of the target cell or a neighbor cell of a neighbor cell of the target cell. For example, 1 bit (bit) indicates a type of a cell in the N cells. When a value of the bit is 0, it indicates that the cell is a neighbor cell of the target cell; and when a value of the bit is 1, it indicates that the cell is a neighbor cell of a neighbor cell of the target cell. For another example, a cell list is used to indicate that a cell in an upper part of the list is a neighbor cell of the target cell, and a cell in a lower part of the list is a neighbor cell of a neighbor cell of the target cell.

Example 2: Indicate rankings of the distances between the N cells and the target cell.

For example, a cell list may be used for indication, and cells from top to bottom in the list represent cells from near to far from the target cell.

Example 3: Each cell in the N cells corresponds to a value, where the value indicates a ranking of the cell in the N cells, and a cell that is closer to the target cell ranks higher.

For example, assuming that the N cells are five cells, a value corresponding to a cell closest to the target cell in the N cells may be 1, a value corresponding to a cell that is second closest to the target cell in the N cells may be 2, a value corresponding to a cell that is third closest to the target cell in the N cells may be 3, a value corresponding to a cell that is fourth closest to the target cell in the N cells may be 4, and a value corresponding to a cell that is furthest from the target cell in the N cells may be 5.

During specific implementation of the foregoing method, in a first case, the first DU may perform random access optimization at any time (where for example, the first DU may periodically perform random access optimization); and in a second case, the first DU may perform random access optimization when a condition is satisfied. The following describes the technical solutions in the two scenarios separately.

First Case

In the first case, optionally, the N cells include a cell conflicting with the PRACH configuration information of the target cell.

Figure 5:
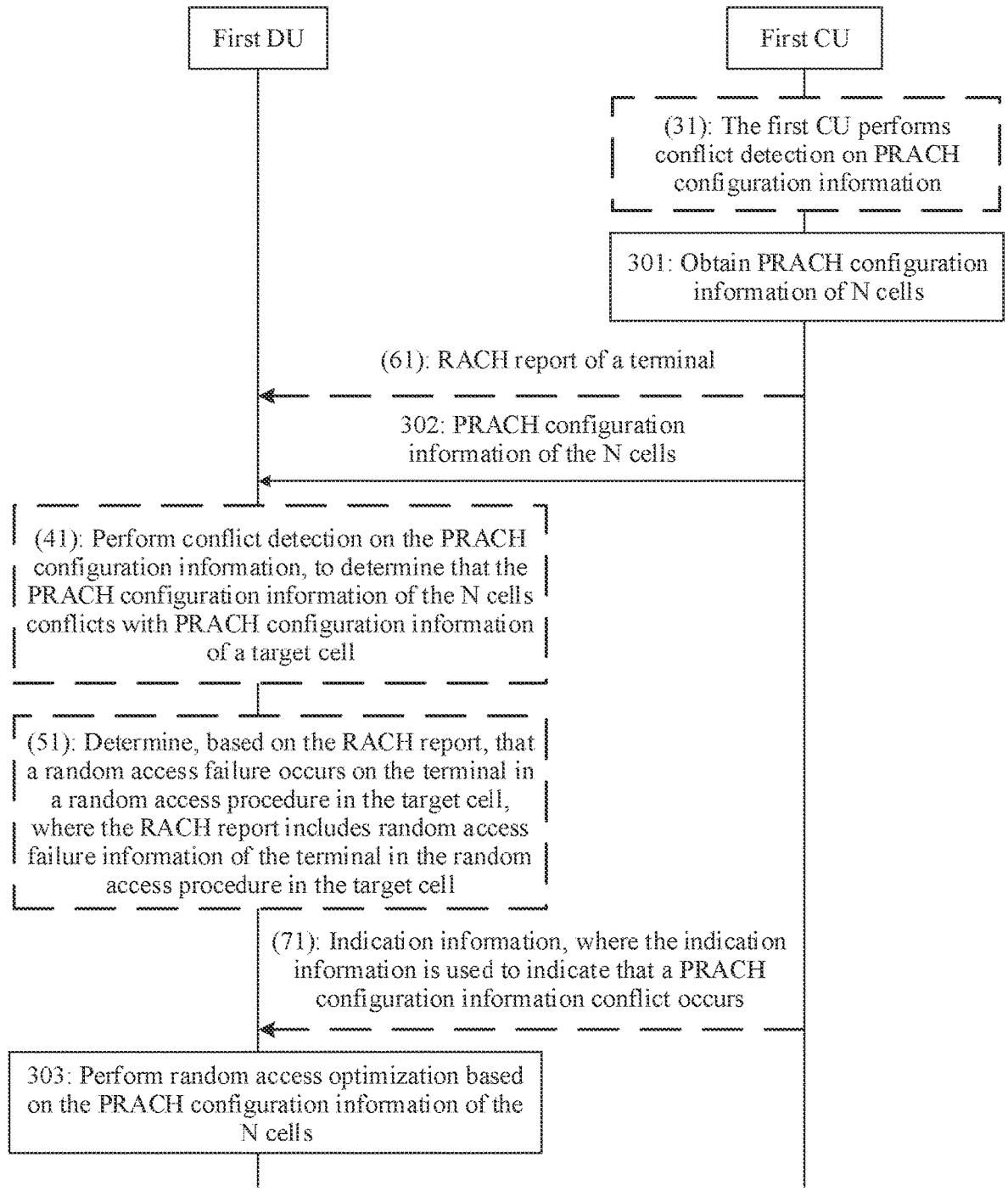
FIG. 5 to FIG. 7 are each a flowchart of a communication method according to an embodiment of this application.

In the first case, referring to FIG. 5, optionally, before step 302, the method further includes: (31) The first CU performs conflict detection on PRACH configuration information. Step (31) may be performed before step 301, or may be performed after step 301.

For example, if all the N cells are cells that conflict with the PRACH configuration information of the target cell, during specific implementation of step (31), the first CU may compare the PRACH configuration information of the target cell with PRACH configuration information of other cells, and determine that the cells that conflict with the PRACH configuration information of the target cell are the N cells. The other cells herein may include only a neighbor cell of the target cell or a neighbor cell of a neighbor cell of the target cell, or may include both a neighbor cell of the N cells and a neighbor cell of a neighbor cell of the target cell.

Second Case

In the second case, the first DU may perform random access optimization when one or more of the following condition 1, condition 2, and condition 3 are satisfied.

Condition 1: The PRACH configuration information of the target cell conflicts with PRACH configuration information of one or more cells in the N cells.

Condition 2: A random access failure occurs on the terminal in the random access procedure in the target cell.

Condition 3: The first DU receives indication information, where the indication information is used to indicate that a PRACH configuration information conflict occurs.

In the condition 1, referring to FIG. 5, optionally, before step 303, the method further includes: (41) The first DU performs conflict detection on the PRACH configuration information, to determine that the PRACH configuration information of the N cells conflicts with the PRACH configuration information of the target cell.

During specific implementation of step (41), the first DU may compare the PRACH configuration information of each cell in the N cells with the PRACH configuration information of the target cell; and when the PRACH configuration information of any one or more cells in the N cells conflicts with the PRACH configuration information of the target cell, determine that the PRACH configuration information of the N cells conflicts with the PRACH configuration information of the target cell.

In the condition 2, referring to FIG. 5, optionally, before step 303, the method further includes: (51) The first DU determines, based on the RACH report, that the random access failure occurs on the terminal in the random access procedure in the target cell, where the RACH report includes random access failure information of the terminal in the random access procedure in the target cell.

In this case, referring to FIG. 5, optionally, before step (51), the method further includes: (61) The first CU sends the RACH report of the terminal to the first DU. Correspondingly, the first DU receives, from the first CU, the RACH report reported by the terminal. The RACH report of the terminal that is sent by the first CU to the first DU and the PRACH configuration information of the N cells may be included in a same message for sending, or may be included in different messages for sending.

During specific implementation of step (51), in a first possible implementation, the first DU may determine that the random access failure occurs on the terminal in the random access procedure in the target cell when a quantity of times that the terminal sends a preamble and that is included in the RACH report is greater than 1. In a second possible implementation, the first DU may determine that the random access failure occurs on the terminal in the random access procedure in the target cell, when a quantity of times that the terminal sends a preamble and that is included in the RACH report is greater than 1, and information about whether the terminal detects contention indicates that the terminal detects contention. In a third possible implementation, the first DU may determine that the random access failure occurs on the terminal in the random access procedure in the target cell, when information that is in the RACH report and that is about whether the terminal detects contention indicates that the terminal detects contention.

In the condition 3, referring to FIG. 5, optionally, before step 303, the method further includes: (71) The first CU sends indication information to the first DU, where the indication information is used to indicate that a PRACH configuration information conflict occurs. Correspondingly, the first DU receives the indication information from the first CU. In this case, the first DU may determine, based on the indication information, that the PRACH configuration information conflict occurs, and thereby may directly adjust the PRACH configuration information of the target cell when required, without determining whether there is a PRACH configuration information conflict.

An execution sequence of step (41), step (51), and step (71) is not limited in this embodiment of this application. FIG. 5 is drawn by using an example in which the execution sequence is step (41), step (51), and step (71). During specific implementation, another execution sequence may be used.

It should be noted that the cell in this embodiment of this application may alternatively be a synchronization signal and physical broadcast channel block (synchronization signal and physical broadcast channel block, SSB for short).

A concept of the SSB is introduced in a fifth generation communication system. Specifically, the SSB includes a primary synchronization signal (primary synchronization signal, PSS for short), a secondary synchronization signal (secondary synchronization signal, SSS for short), and a physical broadcast channel (physical broadcast channel, PBCH for short), and occupies four symbols in time domain and 240 subcarriers in frequency domain. Within a frequency range of one carrier, a plurality of SSBs may be transmitted. Each SSB corresponds to one physical cell identifier (physical cell identifier, PCI for short), and the PCIs of the SSBs may be the same or may be different. The terminal may obtain the PCI and uplink synchronization by using the PSS. The terminal may obtain a cyclic prefix (cyclic prefix, CP for short) length, a physical cell group identifier (ID), and frame synchronization by using the SSS. The terminal can obtain a master information block (master information block, MIB for short) by decoding the PBCH, where the MIB includes a quantity of common antenna ports, a system frame number (system frame number, SFN for short), downlink system bandwidth, and physical hybrid automatic repeat request indication information (physical hybrid automatic repeat request indicator channel, PHICH for short) configuration information.

Specifically, when one SSB is associated with remaining minimum system information (remaining minimum system information, RMSI for short), the SSB corresponds to an independent cell, and the cell has a unique NR cell global identifier (NR cell global identifier, NCGI for short). In this case, such an SSB is referred to as a cell defining SSB (cell defining SSB, CD-SSB for short). Only the CD-SSB can be used to send a MIB message and a system information block1 (system information block1, SIB1 for short) message. In addition, when performing cell selection, the terminal performs access based on only a synchronization signal of the CD-SSB. Another SSB can be used to send only a MIB message but cannot be used to send a SIB1 message.

It should be understood that a type of the SSB is not limited in this application, and the type includes the foregoing CD-SSB and an SSB other than the CD-SSB.

It should be further understood that a basic concept of the SSB is already defined in detail in an existing protocol. This application merely briefly describes the SSB. The foregoing descriptions of the SSB cannot limit the protection scope of this application, but are merely intended to enhance understanding of the embodiments of this application.

To make the embodiments of this application clearer, the following describes the foregoing embodiments by using Embodiment 1 and Embodiment 2. Differences between Embodiment 1 and Embodiment 2 include: In Embodiment 1, a first DU detects whether PRACH configuration information of a target cell conflicts with PRACH configuration information of another cell. In Embodiment 2, a first CU detects whether PRACH configuration information of a target cell conflicts with PRACH configuration information of another cell.

Embodiment 1

Figure 6:
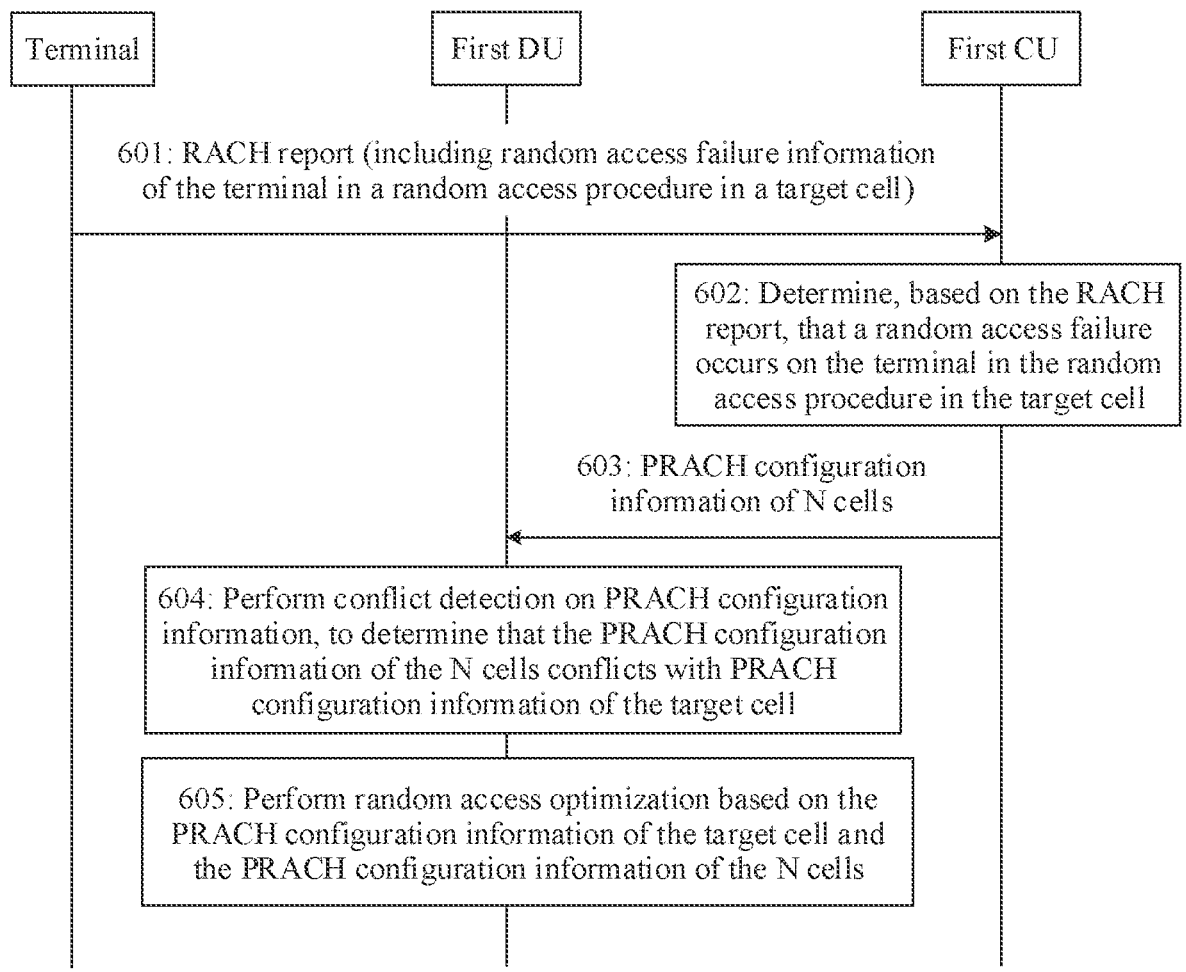

Referring to FIG. 6, a method provided in Embodiment 1 includes the following steps.

601: A first CU receives an RACH report reported by a terminal, where the RACH report includes random access failure information of the terminal in a random access procedure in a target cell. For information included in the RACH report, refer to the foregoing descriptions. Details are not described herein again.

602: The first CU determines, based on the RACH report, that a random access failure occurs on the terminal in the random access procedure in the target cell.

A method in which the first CU determines, based on the RACH report, that the random access failure occurs on the terminal in the random access procedure in the target cell is the same as that used by a first DU. For specific implementation, refer to the foregoing descriptions related to the condition 2. Details are not described herein again. Step 601 and step 602 are optional.

603: The first CU sends PRACH configuration information of N cells to the first DU. Correspondingly, the first DU receives the PRACH configuration information of the N cells from the first CU.

The first DU is a DU supporting the target cell. The N cells include a neighbor cell of the target cell. Optionally, the N cells further include a neighbor cell of the neighbor cell of the target cell.

604: The first DU performs conflict detection on PRACH configuration information, to determine that the PRACH configuration information of the N cells conflicts with PRACH configuration information of the target cell.

When the PRACH configuration information of the target cell conflicts with PRACH configuration information of any one or more cells in the N cells, it is considered that the PRACH configuration information of the target cell conflicts with the PRACH configuration information of the N cells. Otherwise, it is considered that the PRACH configuration information of the target cell does not conflict with the PRACH configuration information of the N cells.

605: The first DU performs random access optimization based on the PRACH configuration information of the target cell and the PRACH configuration information of the N cells.

For specific implementation of step 605, refer to step (11) above. Details are not described herein again.

According to the method provided in Embodiment 1, the first CU notifies the first DU of the PRACH configuration information of the N cells, and the first DU detects whether a PRACH configuration information conflict occurs and adjusts the PRACH configuration information of the target cell, to avoid preamble interference or a preamble conflict between cells, so that a random access success rate is increased, and a random access delay is reduced.

Embodiment 2

Figure 7:
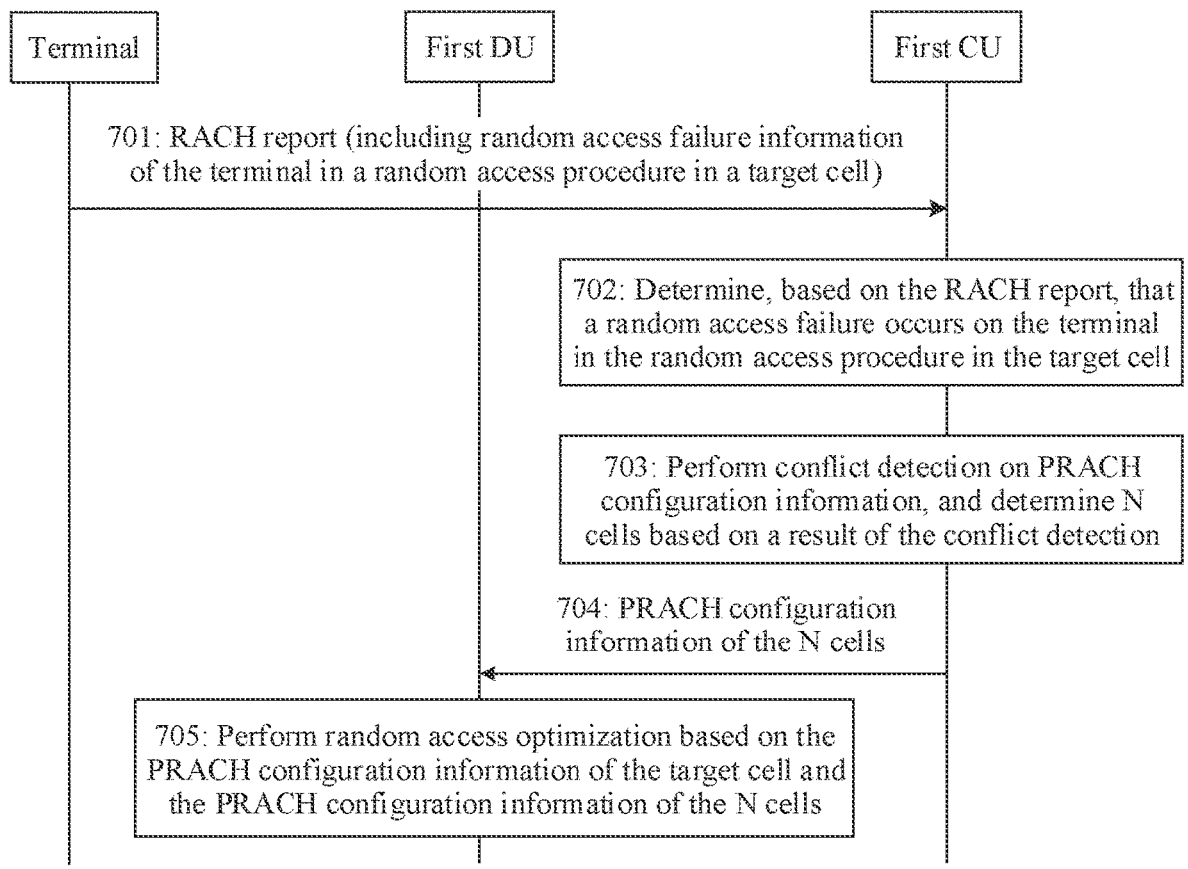

Referring to FIG. 7, a method provided in Embodiment 2 includes the following steps.

701: A first CU receives an RACH report reported by a terminal, where the RACH report includes random access failure information of the terminal in a random access procedure in a target cell. For information included in the RACH report, refer to the foregoing descriptions. Details are not described herein again.

702: The first CU determines, based on the RACH report, that a random access failure occurs on the terminal in the random access procedure in the target cell.

A method in which the first CU determines, based on the RACH report, that the random access failure occurs on the terminal in the random access procedure in the target cell is the same as that used by a first DU. For specific implementation, refer to the foregoing descriptions related to the condition 2. Details are not described herein again. Step 701 and step 702 are optional.

703: The first CU performs conflict detection on PRACH configuration information, and determines N cells based on a result of the conflict detection, where a cell in the N cells is a cell conflicting with PRACH configuration information of the target cell.

During specific implementation of step 703, the first CU may compare the PRACH configuration information of the target cell with PRACH configuration information of at least one neighbor cell of the target cell, and determines that at least one cell that is in the at least one neighbor cell of the target cell and that conflicts with the PRACH configuration information of the target cell is the N cells. The neighbor cell of the target cell herein may alternatively be replaced with a neighbor cell of the target cell and a neighbor cell of the neighbor cell of the target cell.

704: The first CU sends PRACH configuration information of the N cells to the first DU. Correspondingly, the first DU receives the PRACH configuration information of the N cells from the first CU.

705: The first DU performs random access optimization based on the PRACH configuration information of the target cell and the PRACH configuration information of the N cells.

For specific implementation of step 705, refer to step (11) above. Details are not described herein again.

According to the method provided in Embodiment 2, the first CU detects whether a PRACH configuration information conflict occurs, and the first CU notifies the first DU of PRACH configuration information of the conflicting cell and the first DU adjusts the PRACH configuration information of the target cell if the conflict occurs. In this way, preamble interference or a preamble conflict between cells is avoided, thereby increasing a random access success rate and reducing a random access delay.

The foregoing mainly describes the solutions in the embodiments of this application from a perspective of interaction between network elements. It may be understood that, to achieve the foregoing functions, each network element, such as the first DU and the first CU, includes a corresponding hardware structure and/or a software module for implementing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, function unit division may be performed on the first CU and the first DU based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, division into the units is an example, and is merely a logical function division. In an actual implementation, another division manner may be used.

Figure 8:
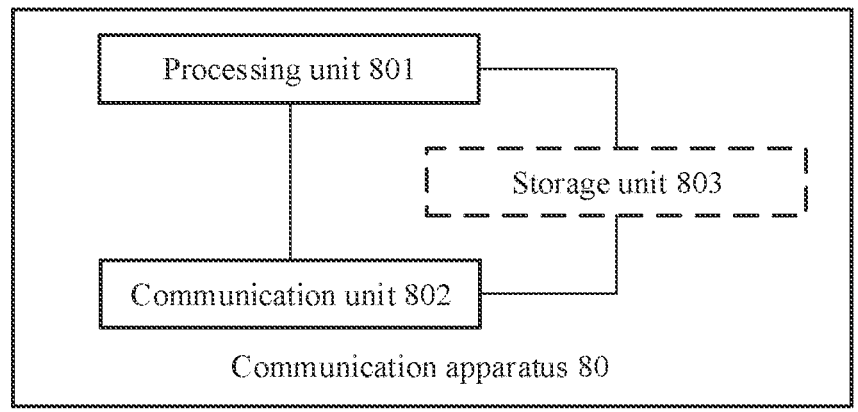
FIG. 8 is a schematic composition diagram of a communication apparatus according to an embodiment of this application.

FIG. 8 is a possible schematic structural diagram of the communication apparatus (denoted as a communication apparatus 80) in the foregoing embodiments when the integrated unit is used. The communication apparatus 80 includes a processing unit 801 and a communication unit 802, and may further include a storage unit 803. The schematic structural diagram shown in FIG. 8 may be used to show a structure of the first DU or first CU in the foregoing embodiments.

When the schematic structural diagram shown in FIG. 8 is used to show the structure of the first DU in the foregoing embodiments, the processing unit 801 is configured to control and manage an action of the first DU. For example, the processing unit 801 is configured to support the first DU in performing steps 302 and 303 in FIG. 3, steps (61), 302, (41), (51), (71), and 303 in FIG. 5, steps 603 to 605 in FIG. 6, steps 704 and 705 in FIG. 7, and/or an action performed by the first DU in another process described in the embodiments of this application. The processing unit 801 may communicate with another network entity by using the communication unit 802, for example, communicate with the first CU shown in FIG. 3. The storage unit 803 is configured to store program code and data of the first DU.

When the schematic structural diagram shown in FIG. 8 is used to show the structure of the first DU in the foregoing embodiments, the communication apparatus 80 may be the first DU, or may be a chip in the first DU.

When the schematic structural diagram shown in FIG. 8 is used to show the structure of the first CU in the foregoing embodiments, the processing unit 801 is configured to control and manage an action of the first CU. For example, the processing unit 801 is configured to support the first CU in performing steps 301 and 302 in FIG. 3, actions performed by the first CU in the example 1 to the example 4 in FIG. 4, steps (31), 301, (61), 302, and (71) in FIG. 5, steps 601 to 603 in FIG. 6, steps 701 to 704 in FIG. 7, and/or an action performed by the first CU in another process described in the embodiments of this application. The processing unit 801 may communicate with another network entity by using the communication unit 802, for example, communicate with the first DU shown in FIG. 3. The storage unit 803 is configured to store program code and data of the first CU.

When the schematic structural diagram shown in FIG. 8 is used to show the structure of the first CU in the foregoing embodiments, the communication apparatus 80 may be the first CU, or may be a chip in the first CU.

When the communication apparatus 80 is the first DU or the first CU, the processing unit 801 may be a processor or a controller, and the communication unit 802 may be a communication interface, a transceiver, a transceiver machine, a transceiver circuit, a transceiver apparatus, or the like. The communication interface is a collective term, and may include one or more interfaces. The storage unit 803 may be a memory. When the communication apparatus 80 is the chip in the first DU or the first CU, the processing unit 801 may be a processor or a controller, and the communication unit 802 may be an input interface and/or an output interface, a pin, a circuit, or the like. The storage unit 803 may be a storage unit (for example, a register or a cache) in the chip, or may be a storage unit (for example, a read-only memory or a random access memory) that is inside the first DU or the first CU and that is located outside the chip.

The communication unit may also be referred to as a transceiver unit. An antenna and a control circuit that have receiving and sending functions in the communication apparatus 80 may be considered as the communication unit 802 in the communication apparatus 80, and a processor that has a processing function in the communication apparatus 80 may be considered as the processing unit 801 in the communication apparatus 80. Optionally, a component configured to implement a receiving function in the communication unit 802 may be considered as a receiving unit. The receiving unit is configured to perform a receiving step in the embodiments of this application. The receiving unit may be a receiver machine, a receiver, a receiver circuit, or the like. A component configured to implement a sending function in the communication unit 802 may be considered as a sending unit. The sending unit is configured to perform a sending step in the embodiments of this application. The sending unit may be a transmitter machine, a transmitter, a sending circuit, or the like.

When an integrated unit in FIG. 8 is implemented in a form of a software function module and sold or used as an independent product, the integrated unit may be stored in a computer-readable storage medium. Based on such an understanding, the technical solutions of the embodiments of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The storage medium that stores the computer software product includes any medium that can store program code, for example, a USB flash drive, a removable hard disk, a read-only memory (read-only memory, ROM for short), a random access memory (random access memory, RAM for short), a magnetic disk, or an optical disc.

The unit in FIG. 8 may alternatively be referred to as a module. For example, the processing unit may be referred to as a processing module.

Figure 9:
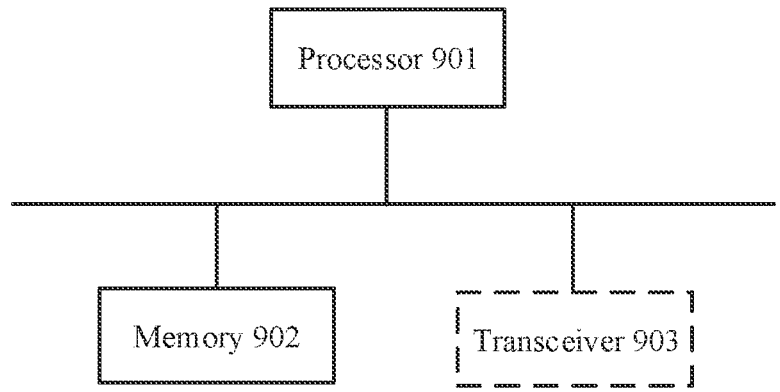
FIG. 9 and FIG. 10 are each a schematic structural diagram of hardware of a communication apparatus according to an embodiment of this application.
Figure 10:
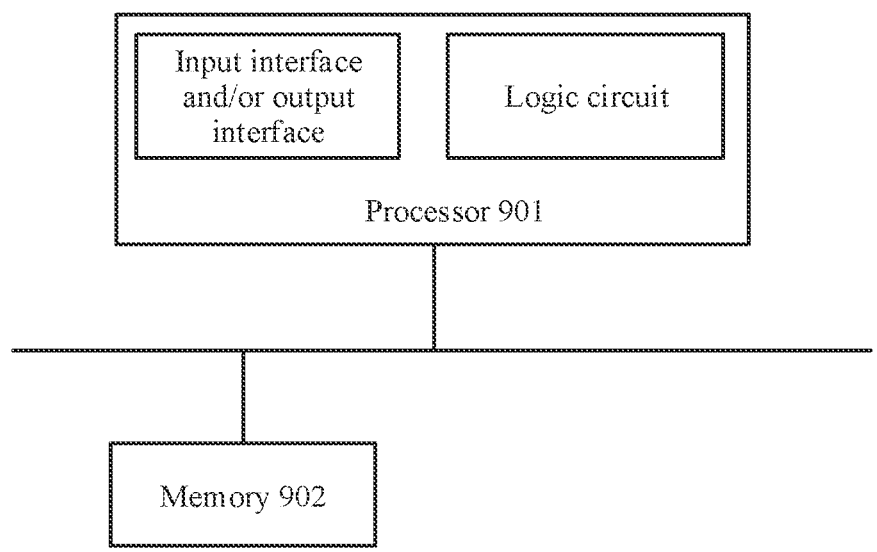

An embodiment of this application further provides a schematic structural diagram of hardware of a communication apparatus (denoted as a communication apparatus 90). Referring to FIG. 9 or FIG. 10, the communication apparatus 90 includes a processor 901. Optionally, the communication apparatus 90 may further include a memory 902 connected to the processor 901.

The processor 901 may be a general-purpose central processing unit (central processing unit, CPU for short), a microprocessor, an application-specific integrated circuit (application-specific integrated circuit, ASIC for short), or one or more integrated circuits configured to control program execution in the solutions in this application. The processor 901 may alternatively include a plurality of CPUs, and the processor 901 may be a single-core (single-CPU) processor or a multi-core (multi-CPU) processor. The processor herein may refer to one or more devices, circuits, and/or processing cores configured to process data (for example, computer program instructions).

The memory 902 may be a ROM or another type of static storage device that can store static information and instructions, or a RAM or another type of dynamic storage device that can store information and instructions, or may be an electrically erasable programmable read-only memory (electrically erasable programmable read-only memory, EEPROM for short), a compact disc read-only memory (compact disc read-only memory, CD-ROM for short) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this is not limited in the embodiments of this application. The memory 902 may exist independently, or may be integrated into the processor 901. The memory 902 may include computer program code. The processor 901 is configured to execute the computer program code stored in the memory 902, to implement the method provided in the embodiments of this application.

In a first possible implementation, referring to FIG. 9, the communication apparatus 90 further includes a transceiver 903. The processor 901, the memory 902, and the transceiver 903 are connected by using a bus. The transceiver 903 is configured to communicate with another device or a communication network. Optionally, the transceiver 903 may include a transmitter and a receiver. A component configured to implement a receiving function in the transceiver 903 may be considered as a receiver. The receiver is configured to perform a receiving step in the embodiments of this application. A component configured to implement a sending function in the transceiver 903 may be considered as a transmitter. The transmitter is configured to perform a sending step in the embodiments of this application.

Based on the first possible implementation, the schematic structural diagram shown in FIG. 9 may be used to show a structure of the first DU or first CU in the foregoing embodiments.

When the schematic structural diagram shown in FIG. 9 is used to show the structure of the first DU in the foregoing embodiments, the processor 901 is configured to control and manage an action of the first DU. For example, the processor 901 is configured to support the first DU in performing steps 302 and 303 in FIG. 3, steps (61), 302, (41), (51), (71), and 303 in FIG. 5, steps 603 to 605 in FIG. 6, steps 704 and 705 in FIG. 7, and/or an action performed by the first DU in another process described in the embodiments of this application. The processor 901 may communicate with another network entity by using the transceiver 903, for example, communicate with the first CU shown in FIG. 3. The memory 902 is configured to store program code and data of the first DU.

When the schematic structural diagram shown in FIG. 9 is used to show the structure of the first CU in the foregoing embodiments, the processor 901 is configured to control and manage an action of the first CU. For example, the processor 901 is configured to support the first CU in performing steps 301 and 302 in FIG. 3, actions performed by the first CU in the example 1 to the example 4 in FIG. 4, steps (31), 301, (61), 302, and (71) in FIG. 5, steps 601 to 603 in FIG. 6, steps 701 to 704 in FIG. 7, and/or an action performed by the first CU in another process described in the embodiments of this application. The processor 901 may communicate with another network entity by using the transceiver 903, for example, communicate with the first DU shown in FIG. 3. The memory 902 is configured to store program code and data of the first CU.

In a second possible implementation, the processor 901 includes a logic circuit and an input interface and/or an output interface. The output interface is configured to perform a sending action in a corresponding method, and the input interface is configured to perform a receiving action in a corresponding method.

Based on the second possible implementation, referring to FIG. 10, the schematic structural diagram shown in FIG. 10 may be used to show a structure of the first DU or first CU in the foregoing embodiments.

When the schematic structural diagram shown in FIG. 10 is used to show the structure of the first DU in the foregoing embodiments, the processor 901 is configured to control and manage an action of the first DU. For example, the processor 901 is configured to support the first DU in performing steps 302 and 303 in FIG. 3, steps (61), 302, (41), (51), (71), and 303 in FIG. 5, steps 603 to 605 in FIG. 6, steps 704 and 705 in FIG. 7, and/or an action performed by the first DU in another process described in the embodiments of this application. The processor 901 may communicate with another network entity by using an input interface and/or an output interface, for example, communicate with the first CU shown in FIG. 3. The memory 902 is configured to store program code and data of the first DU.

When the schematic structural diagram shown in FIG. 10 is used to show the structure of the first CU in the foregoing embodiments, the processor 901 is configured to control and manage an action of the first CU. For example, the processor 901 is configured to support the first CU in performing steps 301 and 302 in FIG. 3, actions performed by the first CU in the example 1 to the example 4 in FIG. 4, steps (31), 301, (61), 302, and (71) in FIG. 5, steps 601 to 603 in FIG. 6, steps 701 to 704 in FIG. 7, and/or an action performed by the first CU in another process described in the embodiments of this application. The processor 901 may communicate with another network entity by using an input interface and/or an output interface, for example, communicate with the first DU shown in FIG. 3. The memory 902 is configured to store program code and data of the first CU.

An embodiment of this application further provides a computer-readable storage medium, including instructions. When the instructions are run on a computer, the computer is enabled to perform any one of the foregoing methods.

An embodiment of this application further provides a computer program product including an instruction. When the computer program product is run on a computer, the computer is enabled to perform any one of the foregoing methods.

An embodiment of this application further provides a communication system, including the foregoing first DU and first CU.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A communication method, comprising:
obtaining, by a first central unit (CU), physical random access channel (PRACH) configuration information of N cells, wherein N is an integer greater than 0; and
sending, by the first CU, the PRACH configuration information of the N cells to a first distributed unit (DU), wherein the N cells comprise a cell conflicting with PRACH configuration information of a target cell, wherein there is a same preamble in available preambles in the cell and the target cell.

2. The method according to claim 1, wherein the N cells comprise a neighbor cell of the target cell, and wherein the target cell is a cell supported by the first DU.

3. The method according to claim 1, wherein before the sending, by the first CU, the PRACH configuration information of the N cells to a first DU, the method further comprises:
performing, by the first CU, conflict detection on PRACH configuration information, wherein the N cells comprise a cell conflicting with PRACH configuration information of the first DU.

4. The method according to claim 1, wherein the obtaining, by a first CU, PRACH configuration information of N cells comprises:
obtaining, by the first CU, the PRACH configuration information of the N cells from operation, administration, and maintenance (OAM);
receiving, by the first CU, the PRACH configuration information of the N cells that is sent by a second DU;
receiving, by the first CU, the PRACH configuration information of the N cells that is sent by a second CU; or
receiving, by the first CU, the PRACH configuration information of the N cells that is sent by the second CU and the second DU.

5. The method according to claim 2, wherein the method further comprises:
sending, by the first CU, a random access channel (RACH) report of a terminal to the first DU, wherein the RACH report comprises random access failure information of the terminal in a random access procedure in the target cell, and wherein the target cell is a cell supported by the first DU.

6. A communication method, comprising:
receiving, by a first distributed unit (DU), physical random access channel (PRACH) configuration information of N cells from a first central unit (CU), wherein N is an integer greater than 0, wherein the N cells comprise a cell conflicting with PRACH configuration information of a target cell, wherein there is a same preamble in available preambles in the cell and the target cell; and
performing, by the first DU, random access optimization based on the PRACH configuration information of the N cells.

7. The method according to claim 6, wherein the N cells comprise a neighbor cell of the target cell, and wherein the target cell is a cell supported by the first DU.

8. The method according to claim 7, wherein before the performing, by the first DU, random access optimization based on the PRACH configuration information of the N cells, the method further comprises at least one of:
performing, by the first DU, conflict detection on PRACH configuration information, to determine that the PRACH configuration information of the N cells conflicts with PRACH configuration information of the target cell; or
receiving, by the first DU, a random access channel (RACH) report of a terminal from the first CU, wherein the RACH report comprises random access failure information of the terminal in a random access procedure in the target cell, and determining, by the first DU based on the RACH report, that a random access failure occurs on the terminal in the random access procedure in the target cell.

9. A communication apparatus, comprises:
a transceiver;
a non-transitory memory storing programming instructions;
at least one processor, the at least one processor is coupled to the non-transitory memory and the transceiver, the communication apparatus is instructed by the programming instructions executed by the at least one processor to perform operations comprising:
obtaining physical random access channel (PRACH) configuration information of N cells, wherein N is an integer greater than 0; and
sending the PRACH configuration information of the N cells to a first distributed unit (DU), wherein the N cells comprise a cell conflicting with PRACH configuration information of a target cell, wherein there is a same preamble in available preambles in the cell and the target cell.

10. The apparatus according to claim 9, wherein the N cells comprise a neighbor cell of the target cell, and the target cell is a cell supported by the first DU.

11. The apparatus according to claim 9, wherein the operations further comprise:
performing conflict detection on PRACH configuration information, wherein the N cells comprise a cell conflicting with PRACH configuration information of the first DU.

12. The apparatus according to claim 9, wherein the operations further comprise:
obtaining the PRACH configuration information of the N cells from operation, administration, and maintenance (OAM);
receiving, by using the transceiver, the PRACH configuration information of the N cells that is sent by a second DU;
receiving, by using the transceiver, the PRACH configuration information of the N cells that is sent by a second central unit (CU); or
receiving, by using the transceiver, the PRACH configuration information of the N cells that is sent by the second CU and the second DU.

13. The apparatus according to claim 10, wherein the operations further comprise:
sending a random access channel (RACH) report of a terminal to the first DU, wherein the RACH report comprises random access failure information of the terminal in a random access procedure in the target cell, and the target cell is a cell supported by the first DU.

14. A communication apparatus, comprises:
a transceiver;
a non-transitory memory storing programming instructions;
at least one processor, the at least one processor is coupled to the non-transitory memory and the transceiver, the communication apparatus is instructed by the programming instructions executed by the at least one processor to perform operations comprising:

receiving physical random access channel (PRACH) configuration information of N cells from a first central unit (CU), wherein N is an integer greater than 0, wherein the N cells comprise a cell conflicting with PRACH configuration information of a target cell, wherein there is a same preamble in available preambles in the cell and the target cell; and performing random access optimization based on the PRACH configuration information of the N cells.

15. The apparatus according to claim 14, wherein the N cells comprise a neighbor cell of the target cell, and the target cell is a cell supported by the apparatus.

16. The apparatus according to claim 15, wherein the operations further comprise at least one of:

performing conflict detection on PRACH configuration information, to determine that the PRACH configuration information of the N cells conflicts with PRACH configuration information of the target cell; or receiving a random access channel (RACH) report of a terminal from the first CU, wherein the RACH report comprises random access failure information of the terminal in a random access procedure in the target cell, and determining, based on the RACH report, that a random access failure occurs on the terminal in the random access procedure in the target cell.

* * * * *

UNITED STATES PATENT AND TRADEMARK OFFICE
CERTIFICATE OF CORRECTION

PATENT NO. : 12,035,379 B2  
APPLICATION NO. : 17/481941  
DATED : July 9, 2024  
INVENTOR(S) : Shuigen Yang et al.

Page 1 of 1

It is certified that error appears in the above-identified patent and that said Letters Patent is hereby corrected as shown below:

On the Title Page

In Column 2 (item (56) Other Publications), In Line 1, Delete "Appln" and insert -- Appln --.

Signed and Sealed this  
Fifth Day of November, 2024

Katherine Kelly Vidal  
*Director of the United States Patent and Trademark Office*